(12) United States Patent
Yasuda

(10) Patent No.: US 10,115,323 B2
(45) Date of Patent: Oct. 30, 2018

(54) ENCRYPTED-DATA PROCESSING METHOD, SYSTEM, AND APPARATUS

(71) Applicant: FUJITSU LIMITED, Kawasaki-shi, Kanagawa (JP)

(72) Inventor: Masaya Yasuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 15/259,632

(22) Filed: Sep. 8, 2016

(65) Prior Publication Data

US 2017/0076639 A1    Mar. 16, 2017

(30) Foreign Application Priority Data

Sep. 11, 2015   (JP) .................................. 2015-180148

(51) Int. Cl.
*G09C 1/00* (2006.01)
*H04L 9/32* (2006.01)
*H04L 9/06* (2006.01)

(52) U.S. Cl.
CPC .............. *G09C 1/00* (2013.01); *H04L 9/0643* (2013.01); *H04L 9/3231* (2013.01); *H04L 2209/04* (2013.01); *H04L 2209/12* (2013.01); *H04L 2209/34* (2013.01)

(58) Field of Classification Search
CPC ........................................................ G09C 1/00
See application file for complete search history.

(56) References Cited

U.S. PATENT DOCUMENTS

| 8,151,162 B2* | 4/2012 | Kanaoka ............ G11B 20/1833 714/755 |
| 2010/0014655 A1* | 1/2010 | Chmora .................. G06F 21/32 380/28 |
| 2013/0174243 A1* | 7/2013 | Inatomi ................. H04L 9/3231 726/7 |

FOREIGN PATENT DOCUMENTS

| JP | 2002-538504 | 11/2002 |
| WO | 00/51244 | 8/2000 |
| WO | 2006/093238 | 9/2006 |

(Continued)

OTHER PUBLICATIONS

Extended European Search Report dated Feb. 8, 2017 for corresponding European Patent Application No. 16188046.3, 6 pages.

(Continued)

*Primary Examiner* — Kambiz Zand
*Assistant Examiner* — Thanh H Le
(74) *Attorney, Agent, or Firm* — Fujitsu Patent Center

(57) ABSTRACT

A first code is generated from data by using a second error correction encoding method, and a second code is generated from the first code and a first random number by using a first error correction encoding method. First masked data is generated by masking registration target data by using the second code, and the first masked data is registered in a database. A third code is generated from a second random number by using the first error correction encoding method. Second masked data is generated by masking matching target data by using the third code. Synthesized data is generated by synthesizing the second masked data and the first masked data registered in the database, and the synthesized data is decoded in accordance with the first error correction encoding method and the second error correction encoding method.

5 Claims, 7 Drawing Sheets

(56) References Cited

FOREIGN PATENT DOCUMENTS

WO      2012/042775      4/2012

OTHER PUBLICATIONS

Rathgeb, Christian et al., "A survey on biometric cryptosystems and cancelable biometrics", EURASIP Journal on Information Security, vol. 2011, No. 1, Jan. 1, 2011, pp. 1-25, XP055033595.
Yasuda, Masaya et al., "Privacy-Preserving Fuzzy Commitment for Biometrics via Layered Error-Correcting Codes", Feb. 25, 2016, Network and Parallel Computing, Springer International Publishing, pp. 117-133, XP047344739.
Ari Juels et al., "A Fuzzy Commitment Scheme", Proceedings of the 6th ACM conference on Computer and communications security CCS '99, Nov. 1, 1999 (10 pages).

\* cited by examiner

TEMPLATE TABLE

| IDENTIFICATION INFORMATION | MASKED VALUE OF BIOMETRIC FEATURE CODE | HASH VALUE OF SECRET INFORMATION |
|---|---|---|
| 1200-3456 | 0110001101110100... | 1100101001011101... |
| ⋮ | ⋮ | ⋮ |

ENCRYPTED-DATA PROCESSING METHOD, SYSTEM, AND APPARATUS

CROSS-REFERENCE TO RELATED APPLICATION

This application is based upon and claims the benefit of priority of the prior Japanese Patent Application No. 2015-180148, filed on Sep. 11, 2015, the entire contents of which are incorporated herein by reference.

FIELD

The embodiments discussed herein relate to an encrypted-data processing method, system, and apparatus.

BACKGROUND

Biometric authentication is currently used as user authentication. In biometric authentication, whether an authentication target user is a registered user is determined based on a physical feature or a behavioral feature of the authentication target user. Examples of the physical feature include a finger print, veins, and an iris, and examples of the behavioral feature include handwriting. In biometric authentication, when registration processing is performed on a user, a biometric feature code that represents a physical feature or a behavioral feature of the user is generated, and a template based on this biometric feature code is registered in a database. When matching processing is performed on a user, a biometric feature code that represents a physical feature or a behavioral feature of the user is generated, and whether the user is registered is determined by using this generated biometric feature code and the corresponding template in the database.

Unlike user IDs, passwords, etc. that can easily be changed when leaked, biometric feature codes cannot easily be changed. Thus, when a biometric authentication system is configured, it is preferable to reduce the risk of leakage of biometric feature codes from the biometric authentication system. There has been proposed template-protection-type biometric authentication as one mode of a biometric authentication method capable of protecting the biometric feature codes.

In the template-protection-type biometric authentication, a biometric feature code itself is not included in an individual template. Instead, data obtained by converting a biometric feature code on the basis of a conversion parameter is included in an individual template. In the template-protection-type biometric authentication, even if a template is leaked, it is difficult to restore the original biometric feature code from a template. In addition, since a different template can be created from the same biometric feature code by changing the conversion parameter, the leaked template can be made invalid.

As one mode of the template-protection-type biometric authentication, biometric encryption such as a fuzzy commitment has been proposed. In a fuzzy commitment, when registration processing is performed on a user, a registration biometric feature code is masked on the basis of secret information such as a password or a secret key, and the masked data is registered in a database. In addition, a hash value of the secret information is registered in the database. When matching processing is performed on the user, the secret information is restored by using a biometric feature code generated in the matching processing and the masked data registered in the database. A hash value of the restored secret information is compared with the hash value registered in the database, so as to determine whether the user is a registered user.

In addition, a fuzzy commitment scheme for generating a fuzzy commitment from an input pattern has been proposed. According to the proposed fuzzy commitment scheme, one of a plurality of codewords associated with an error-correcting code is randomly selected, and an input pattern received from a user is mapped to the selected codeword. According to the fuzzy commitment scheme, an offset between the input pattern and the selected codeword is calculated, and a hash of the selected codeword is calculated.

In addition, an authentication device capable of protecting a template used in biometric authentication has been proposed. The proposed authentication device divides a single template into a plurality of partial templates on the basis of an error-correcting code. The authentication device embeds the plurality of partial templates in a biometric authentication object on the basis of the error-correcting code to obfuscate the template. The authentication device transmits the biometric authentication object including the obfuscated template.

There has also been proposed a biometric authentication system capable of preventing a spoofing attack even if a template and key information are leaked. In the proposed biometric authentication system, when registration processing is performed on a user, a registration device acquires a registration biometric feature code and issues key information. The registration device generates the exclusive OR of the registration biometric feature code, the key information, and a randomly selected authentication parameter as a template and transmits the key information to the terminal device. When matching processing is performed, an authentication device acquires a biometric feature code for matching. In addition, the terminal device generates the exclusive OR of a randomly selected masked value and key information as secret key information and transmits the secret key information to the authentication device. The authentication device generates the exclusive OR of the matching biometric feature code, the template, and the secret key information as an error-corrected information and transmits the error-corrected information to the terminal device. The terminal device generates the exclusive OR of the error-corrected information and the masked value as authentication target information and transmits this information to the authentication device. The authentication device determines whether to authenticate the user on the basis of the degree of coincidence between the authentication target information and the authentication parameter.

See, for example, the following documents:
International Publication Pamphlet No. WO00/51244;
International Publication Pamphlet No. WO2006/093238;
International Publication Pamphlet No. WO2012/042775; and
Ari Juels and Martin Wattenberg, "A fuzzy commitment scheme", Proc. of the 6th ACM (Association for Computing Machinery) conference on Computer and Communications Security, pp. 28-36, 1999.

However, according to the technique discussed in Non-Patent Literature 1, a biometric feature code itself generated in the matching processing is used for calculation with a template. In addition, according to this technique, when a user is authenticated, accurate secret information is restored. Since the masked data included in a template is data obtained by masking a registration biometric feature code on the basis of secret information, an authentication device could estimate the registration biometric feature code from the restored secret information and the template. Thus, if a malicious administrator or attacker fraudulently operates the authentication device, biometric feature codes could be leaked.

SUMMARY

According to one aspect, there is provided an encrypted-data processing method including: generating a first code from first data by using a second error correction encoding method and generating a second code from the first code and a first random number by using a first error correction encoding method; generating first masked data by masking registration target data by using the second code and registering the first masked data in a database; generating a third code from a second random number by using the first error correction encoding method; generating second masked data by masking matching target data by using the third code; and generating synthesized data by synthesizing the second masked data and the first masked data registered in the database and decoding the synthesized data in accordance with the first error correction encoding method and the second error correction encoding method.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a template table;

DESCRIPTION OF EMBODIMENTS

Figure 1:
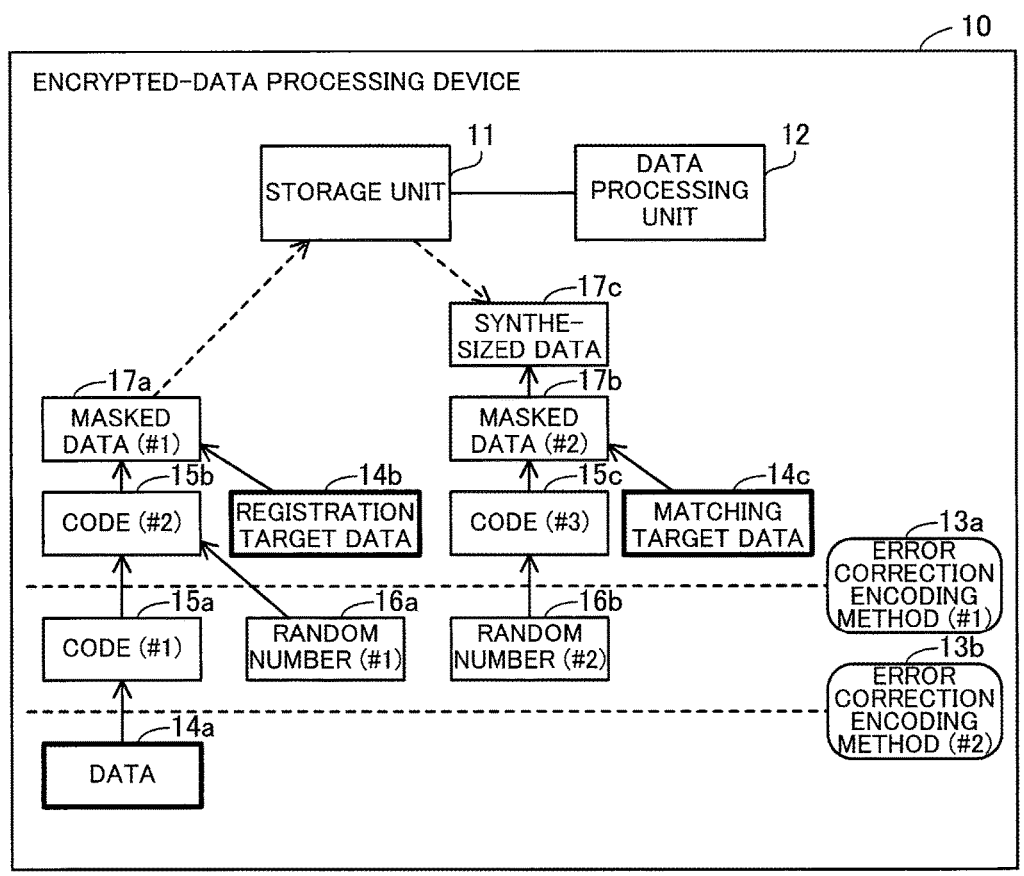
FIG. 1 illustrates an example of an encrypted-data processing device according to a first embodiment.

Embodiments will be described below with reference to the accompanying drawings, wherein like reference characters refer to like elements throughout.

First Embodiment

A first embodiment will be described.

FIG. 1 illustrates an example of an encrypted-data processing device 10 according to a first embodiment.

The encrypted-data processing device 10 according to the first embodiment is a security device that reduces a risk of leakage of protection target data. For example, the encrypted-data processing device 10 is an authentication device that performs user authentication such as biometric authentication. The encrypted-data processing device 10 may be a computer such as a client computer or a server computer.

The encrypted-data processing device 10 includes a storage unit 11 and a data processing unit 12. The storage unit 11 may be a volatile semiconductor memory such as a random access memory (RAM) or a non-volatile storage such as a hard disk drive (HDD) or a flash memory. For example, the data processing unit 12 is a processor such as a central processing unit (CPU) or a digital signal processor (DSP). The data processing unit 12 may include an electronic circuit for specific use such as an application specific integrated circuit (ASIC) or a field programmable gate array (FPGA). The processor executes programs held in a memory such as a RAM. The programs include an encrypted-data processing program. A group of processors (multiprocessor) may be referred to as a "processor."

The processing executed by the encrypted-data processing device 10 includes registration processing and matching processing.

In the registration processing, the data processing unit 12 acquires data 14a. For example, the data 14a is secret information, such as a user ID, a password, or a secret key, given to a registration target user. The data 14a is not expected to be publicly available. The data processing unit 12 generates a code 15a (a first code) from the data 14a by using an error correction encoding method 13b (a second error correction encoding method). The error correction encoding method 13b is an encoding method having an error correction capability of a predetermined bit number. An encoding method of any kind may be used as the error correction encoding method 13b. Linear encoding or non-linear encoding may be used as the error correction encoding method 13b.

The data processing unit 12 generates a random number 16a (a first random number) in such a manner that the Hamming distance of the random number 16a does not exceed the error correction capability of the error correction encoding method 13b. The data processing unit 12 generates a code 15b (a second code) from the code 15a and the random number 16a by using an error correction encoding method 13a (a first error correction encoding method). For example, the data processing unit 12 encodes the exclusive OR of the code 15a and the random number 16a. The error correction encoding method 13a is an encoding method having an error correction capability of a predetermined bit number. A linear encoding method of any kind may be used as the error correction encoding method 13a. Linear encoding has a property that, regarding arbitrary data $\alpha$ and $\beta$, the exclusive OR of an encoding result of the data $\alpha$ and an encoding result of the data $\beta$ matches an encoding result of the exclusive OR of the data $\alpha$ and the data $\beta$. The error correction encoding methods 13a and 13b may be the same kind or different kinds of error correction encoding.

The data processing unit 12 acquires registration target data 14b. For example, the registration target data 14b is a biometric feature code extracted from a biological image captured when the registration processing is performed. For example, the biometric feature code represents a physical feature or a behavioral feature of a user such as a finger print, a vein pattern, an iris, or handwriting. The data processing unit 12 masks the registration target data 14b by using the code 15b to generate masked data 17a (first masked data). For example, the masked data 17a is the exclusive OR of the registration target data 14b and the code 15b. The data processing unit 12 registers the masked data 17a in the storage unit 11. The storage unit 11 includes a database.

When the matching processing is performed, the data processing unit 12 generates a random number 16b (a second random number) in such a manner that the Hamming distance of the random number 16b does not exceed the error correction capability of the error correction encoding method 13b. The data processing unit 12 generates a code 15c (a third code) from the random number 16b by using the error correction encoding method 13a. In addition, the data processing unit 12 acquires matching target data 14c. For example, the matching target data 14c is a biometric feature code extracted from a biological image captured when the matching processing is performed. The data processing unit 12 masks the matching target data 14c by using the code 15c to generate masked data 17b (second masked data). For example, the masked data 17b is the exclusive OR of the matching target data 14c and the code 15c.

The data processing unit 12 acquires the masked data 17a registered in the storage unit 11 and generates synthesized data 17c by synthesizing the masked data 17a and the masked data 17b. For example, the synthesized data 17c is the exclusive OR of the masked data 17a and the masked data 17b. The data processing unit 12 decodes the synthesized data 17c by using a method based on the error correction encoding method 13a and decodes the obtained decoding result by using a method based on the error correction encoding method 13b. Namely, the data processing unit 12 performs error correction decoding on the synthesized data 17c twice.

The synthesized data 17c is a result obtained by synthesizing the code 15b, the registration target data 14b, the code 15c, and the matching target data 14c. Since the error correction encoding method 13a is linear encoding, the synthesized data 17c corresponds to a result obtained by encoding the code 15a, the random number 16a, and the random number 16b by using the error correction encoding method 13a and a result obtained by synthesizing the registration target data 14b and the matching target data 14c. Herein, the registration target data 14b and the matching target data 14c are assumed to be close enough to each other (for example, the registered user and the authentication target user are the same user). In this case, the difference between the registration target data 14b and the matching target data 14c corresponds to a minor noise that can be removed by the error correction encoding method 13a.

Thus, when the synthesized data 17c is decoded by using a method based on the error correction encoding method 13a, a result obtained by encoding the code 15a, the random number 16a, and the random number 16b by using the error correction encoding method 13b appears. In addition, as described above, the random numbers 16a and 16b correspond to minor noises that can be removed by the error correction encoding method 13b. Thus, when the above decoding result is decoded by using a method based on the error correction encoding method 13b, the data 14a is restored. However, if the registration target data 14b and the matching target data 14c are not close enough (for example, the registered user and the authentication target user are different users), the data 14a is not accurately restored.

By using the result obtained by performing the error correction decoding twice, the encrypted-data processing device 10 is able to perform various kinds of processing. For example, the encrypted-data processing device 10 is able to perform user authentication by using the data 14a and the decoding result. The encrypted-data processing device 10 may compare the decoding result with the data 14a and may determine success of authentication when the data 14a and the decoding result match and determine failure of authentication otherwise. The encrypted-data processing device 10 may register a hash value of the data 14a in the storage unit 11 when performing the registration processing and may compare a hash value of the decoding result with the hash value registered in the storage unit 11 when performing the matching processing. In addition, for example, the encrypted-data processing device 10 may use input information, such as a secret number or a card number, inputted to a different authentication system as the data 14a and input accurately restored data 14a to the different authentication system for a user.

While the encrypted-data processing device 10 in FIG. 1 performs both the registration processing and the matching processing, a plurality of devices may separately perform the registration processing and the matching processing. For example, a terminal device operated by a registration target user may perform the processing for generating the masked data 17a from the data 14a and the registration target data 14b. The storage unit 11 or a database in which the masked data 17a is registered may be included in an authentication device different from the terminal device or in a database server different from the terminal device and the authentication device. In addition, a terminal device operated by an authentication target user may perform the processing for generating the masked data 17b from the matching target data 14c. The same device or different devices may be used as the terminal device used for the registration processing and as the terminal device used for the matching processing. In addition, the authentication device may perform the processing for generating the synthesized data 17c from the masked data 17a and 17b and decoding the synthesized data 17c.

The encrypted-data processing device 10 according to the first embodiment, instead of the matching target data 14c, the masked data 17b obtained by masking based on the random number 16b is used for the calculation with the masked data 17a when the matching processing is performed. Thus, the risk of leakage of the matching target data 14c is reduced. In addition, the masked data 17a registered in the storage unit 11 depends not only on the data 14a but also on the random number 16a generated in the registration processing. Thus, even if the data 14a is restored in the matching processing, it is difficult to estimate the registration target data 14b from the masked data 17a and the data 14a. Thus, the risk of leakage of the registration target data 14b is reduced. In addition, when the difference between the registration target data 14b and the matching target data 14c is small, the difference and the random numbers 16a and 16b are removed as minor noises in the process of the two error correction decoding operations. Thus, the data 14a is accurately restored.

Second Embodiment

Next, a second embodiment will be described.

Figure 2:
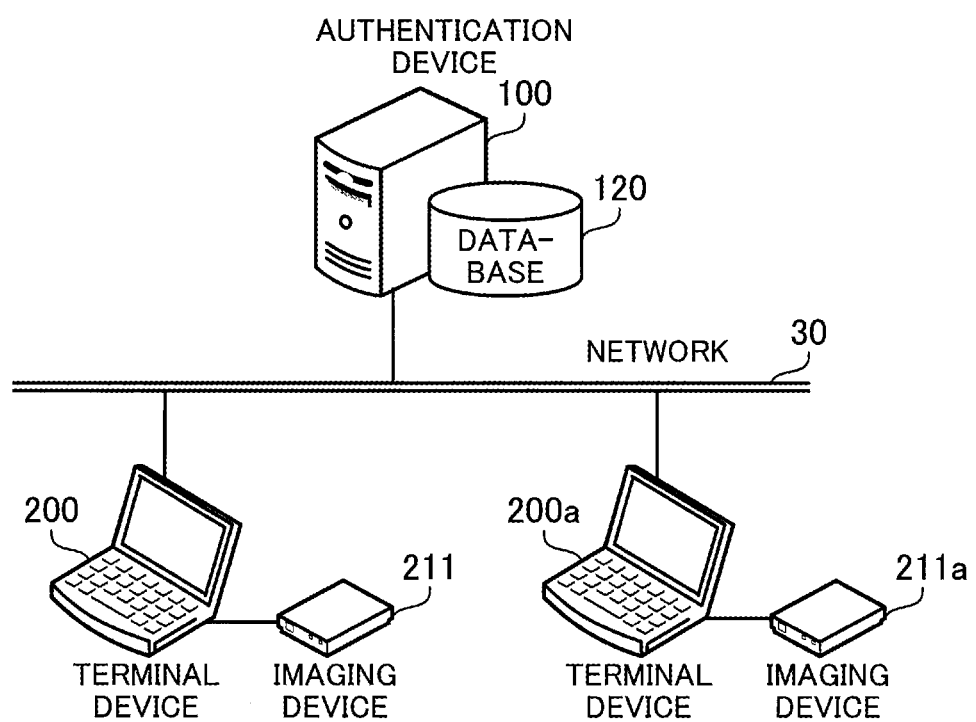
FIG. 2 illustrates an example of an information processing system according to a second embodiment.

FIG. 2 illustrates an example of an information processing system according to a second embodiment.

The information processing system according to the second embodiment is an authentication system that performs biometric authentication. This information processing system includes an authentication device 100 and terminal devices 200 and 200a. The authentication device 100 and the terminal devices 200 and 200a are connected to a network 30. The network 30 may be a local area network (LAN) or a wide area network such as the Internet. The authentication device 100 and the terminal devices 200 and 200a may be installed at the same facility or different facilities. In the latter case, the authentication device 100 may be installed at a facility such as a data center dedicated for information processing.

The authentication device 100 is a server computer that authenticates users that use the terminal devices 200 and 200a. As described above, biometric authentication is performed as the user authentication. The authentication device 100 includes a database 120 that holds templates about registered users. An individual template is generated on the basis of feature information (a biometric feature code) extracted from a biological image and is referred to when whether the users that use the terminal devices 200 and 200a are registered users is determined. An individual template is data different from a biometric feature code. Even if a template is leaked, the template cannot be inversely converted into the corresponding biometric feature code. Thus, the corresponding biometric feature code is protected.

In the registration processing, the authentication device 100 receives registration requests from the terminal devices 200 and 200a. The registration requests include templates generated by the terminal devices 200 and 200a, respectively. Both the templates are generated on the basis of biological images captured in the registration processing, respectively. The authentication device 100 registers the received templates in the database 120. In the matching processing, the authentication device 100 receives matching requests from the terminal devices 200 and 200a, respectively. The matching requests include matching data generated by the terminal devices 200 and 200a, respectively. Both the matching data is generated on the basis of biological images captured in the matching processing, respectively. The authentication device 100 determines whether to authenticate the users using the terminal devices 200 and 200a by using the received matching data and the templates registered in the database 120. The authentication device 100 notifies each of the terminal devices 200 and 200a of an authentication result (success or failure of authentication).

The location of the database 120 is not particularly limited as long as the database 120 is accessible by the authentication device 100. For example, the database 120 may be included in a device (for example, a database server) different from the authentication device 100. In addition, one device (a registration device) may register templates in the database 120, and another device (an authentication device in a narrow sense) may determine whether to authenticate users by using the registered templates.

The terminal devices 200 and 200a are devices operated by users. The terminal devices 200 and 200a may be devices owned by users such as client computers or portable terminal devices or may be devices shared by a plurality of users such as automated teller machines (ATMs).

Imaging devices 211 and 211a are connected to the terminal devices 200 and 200a, respectively. The imaging devices 211 and 211a capture biological images that represent physical or behavioral features of users. Examples of the physical feature include a finger print, veins, and an iris, and examples of the behavioral feature include handwriting. The terminal devices 200 and 200a may previously determine the feature type used for biometric authentication. In this case, the imaging devices 211 and 211a may have a shape especially designed for the feature type so that the biological images that represent the previously determined feature type are efficiently captured. For example, when veins are used for biometric authentication, the imaging devices 211 and 211a may have a shape so that an image of a palm is easily captured.

In the registration processing, the terminal device 200 captures a biological image by using the imaging device 211. The terminal device 200 generates a biometric feature code from the captured biological image and generates a template from the biometric feature code. The terminal device 200 transmits a registration request including the generated template to the authentication device 100. In the matching processing, the terminal device 200 captures a biological image by using the imaging device 211. The terminal device 200 generates a biometric feature code from the captured biological image and generates matching data from the biometric feature code. The terminal device 200 transmits a matching request including the generated matching data to the authentication device 100. The terminal device 200 receives an authentication result from the authentication device 100 and controls a user interface on the basis of the authentication result.

If the user of the terminal device 200 is authenticated, for example, the terminal device 200 displays a message indicating success of authentication on a display and allows the user to use all the services provided by the terminal device 200. However, if the user is not authenticated, for example, the terminal device 200 displays a message indicating failure of authentication on a display and prohibits the user from using at least a part of the services provided by the terminal device 200.

The terminal device 200a is also able to perform the registration and matching processing in the same way as the terminal device 200. A user may use the same terminal or different terminals for the registration and matching processing. For example, a user may use the terminal device 200 for the registration processing and use the terminal device 200a for the matching processing. The terminal device 200 may exclusively be used for the registration processing, and the terminal device 200a may exclusively be used for the matching processing.

Figure 3:
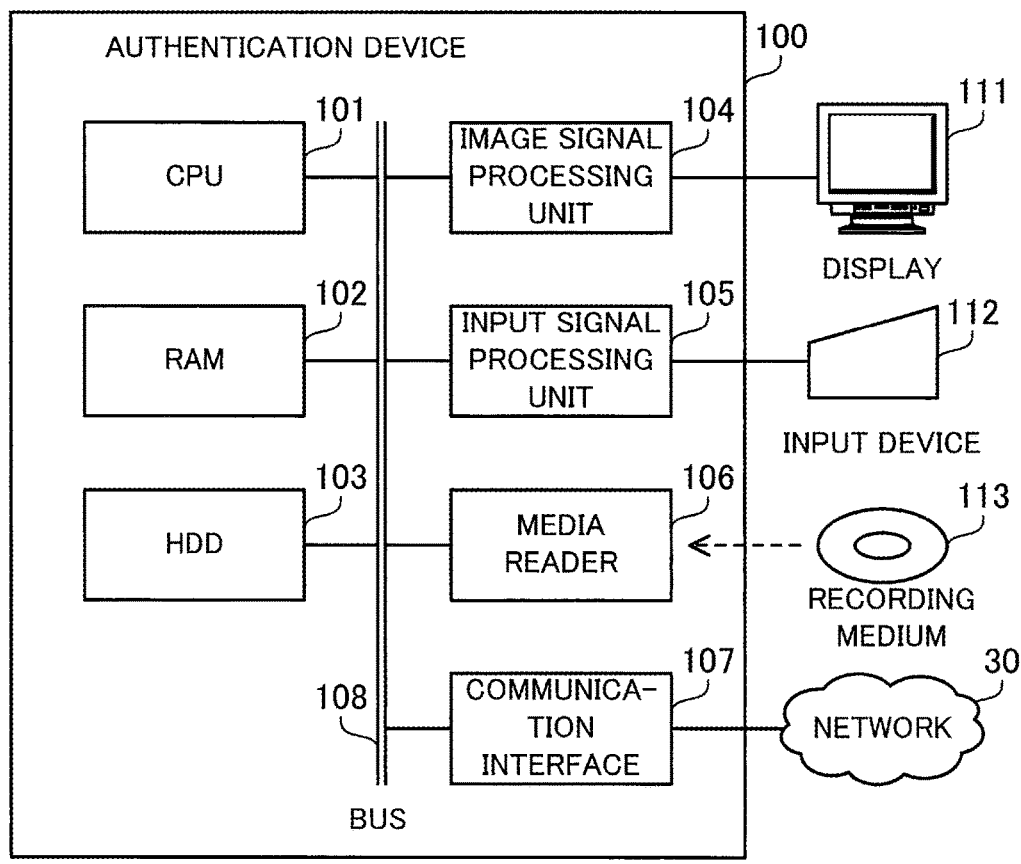
FIG. 3 is a block diagram illustrating an example of a hardware configuration of an authentication device.

FIG. 3 is a block diagram illustrating an example of a hardware configuration of the authentication device 100.

The authentication device 100 includes a CPU 101, RAM 102, HDD 103, an image signal processing unit 104, an input signal processing unit 105, a media reader 106, and a communication interface 107. These units are connected to a bus 108.

The CPU 101 is a processor which includes an arithmetic circuit that executes program instructions. The CPU 101 loads at least a part of programs or data held in the HDD 103 to the RAM 102 and executes the program. The CPU 101 may include a plurality of processor cores, and the authentication device 100 may include a plurality of processors. The processing described below may be executed in parallel by using a plurality of processors or processor cores. In addition, a group of processors (multiprocessor) may be referred to as a "processor."

The RAM 102 is a volatile semiconductor memory that temporarily holds a program executed by the CPU 101 or data used by the CPU 101 for calculation. The authentication device 100 may include a different kind of memory other than a RAM. The authentication device 100 may include a plurality of memories.

The HDD 103 is a non-volatile storage device that holds software programs and data such as an operating system (OS), middleware, or application software. The programs include an encrypted-data processing program. The authentication device 100 may include a different kind of storage device such as a flash memory or a solid state drive (SSD). The authentication device 100 may include a plurality of non-volatile storage devices.

The image signal processing unit 104 outputs an image to a display 111 connected to the authentication device 100 in accordance with instructions from the CPU 101. Examples of the display 111 include a cathode ray tube (CRT) display, a liquid crystal display (LCD), a plasma display panel (PDP), and an organic electro-luminescence (OEL) display.

The input signal processing unit 105 acquires an input signal from an input device 112 connected to the authentication device 100 and outputs the input signal to the CPU 101. Examples of the input device 112 include a pointing device such as a mouse, a touch panel, a touch pad, or a trackball, a keyboard, a remote controller, and a button switch. A plurality of kinds of input devices may be connected to the authentication device 100.

The media reader 106 is a reading device that reads programs or data recorded in a recording medium 113. Examples of the recording medium 113 include a magnetic disk such as a flexible disk (FD) or an HDD, an optical disc such as a compact disc (CD) or a digital versatile disc (DVD), a magneto-optical disk (MO), and a semiconductor memory. For example, the media reader 106 stores a program or data read from the recording medium 113 in the RAM 102 or the HDD 103.

The communication interface 107 is an interface that is connected to a network 30 and that communicates with the terminal devices 200 and 200a via the network 30. The communication interface 107 may be a wired communication interface connected to a communication device such as a switch via a cable or may be a wireless communication interface connected to a base station via a wireless link.

The terminal devices 200 and 200a may be implemented by using a hardware configuration similar to that of the authentication device 100. However, as described above, the imaging device 211 is connected to the terminal device 200, and the imaging device 211a is connected to the terminal device 200a. The imaging devices 211 and 211a may be considered to be a kind of input device. Each of the terminal devices 200 and 200a includes an interface for acquiring a biological image from an imaging device connected thereto. The acquired biological image is stored in a storage device such as a RAM or an HDD, for example.

As described above, in the information processing system according to the second embodiment, a biometric feature code is protected from being leaked even when a template registered in the database 120 is leaked. This type of biometric authentication may be referred to as "template-protection-type biometric authentication."

The information processing system according to the second embodiment uses "biometric encryption," which is a mode of the template-protection-type biometric authentication. In biometric encryption, in the registration processing, a biometric feature code and user-specific secret information are used to generate a template. In the matching processing, a biometric feature code of a matching target user is used to restore the corresponding secret information hidden in the corresponding template. Next, the user is authenticated on the basis of the restored secret information. Namely, in biometric encryption, secret information is kept secret by using a biometric feature code. Secret information kept secret cannot be restored accurately by a biometric feature code of a third party other than the corresponding registered user.

Figure 4:
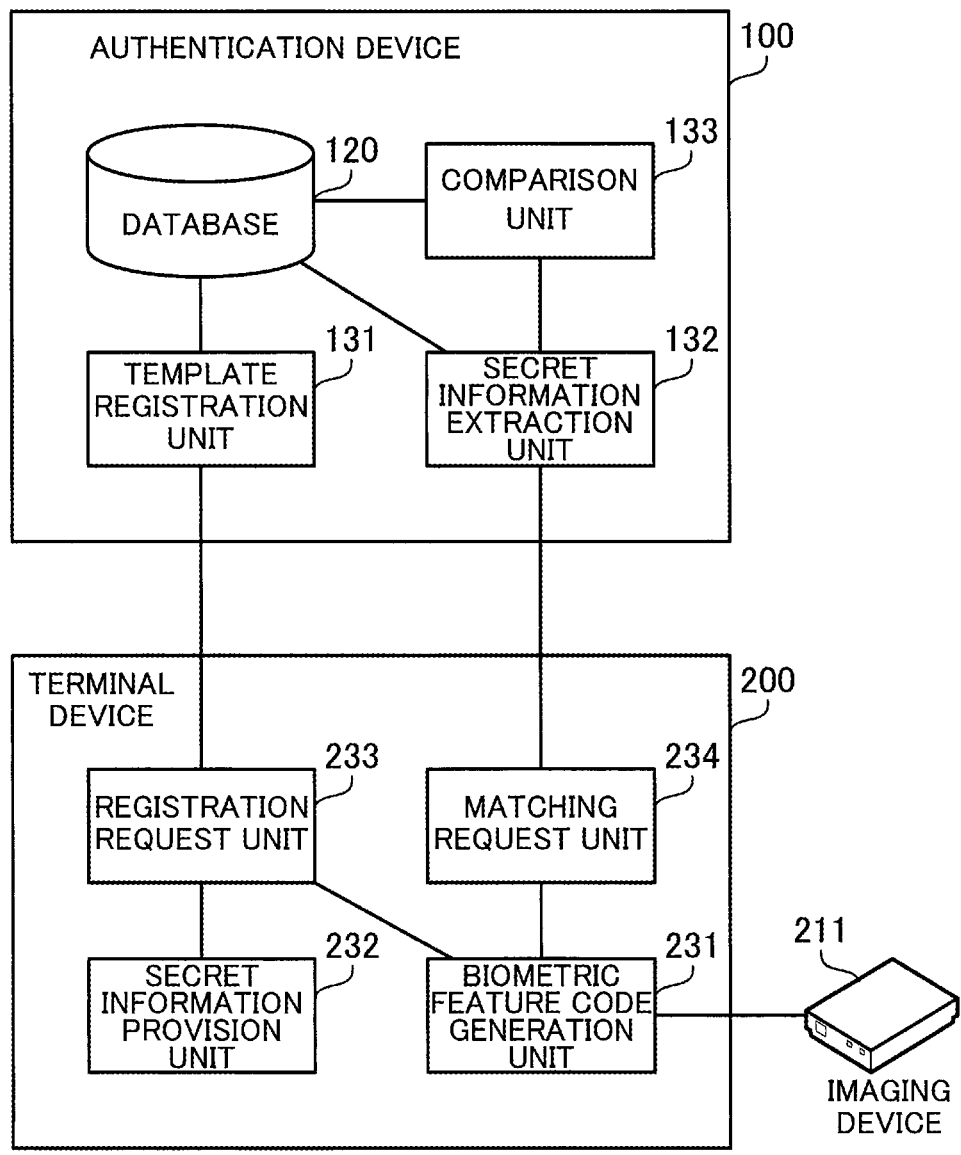
FIG. 4 is a block diagram illustrating an example of functions of the authentication device and a terminal device.

FIG. 4 is a block diagram illustrating an example of functions of the authentication device 100 and the terminal device 200.

The terminal device 200 includes a biometric feature code generation unit 231, a secret information provision unit 232, a registration request unit 233, and a matching request unit 234. For example, the biometric feature code generation unit 231, the secret information provision unit 232, the registration request unit 233, and the matching request unit 234 may be implemented by using program modules executed by a CPU. The terminal device 200a may also be implemented by the same configuration as that of the terminal device 200.

When the user of the terminal device 200 gives a registration or matching instruction, the biometric feature code generation unit 231 instructs the imaging device 211 to capture a biological image and acquires the captured biological image from the imaging device 211. For example, the biometric feature code generation unit 231 acquires an image of a finger tip, a palm, or an eye of the user or an image of a signature written by the user. The biometric feature code generation unit 231 generates a biometric feature code from the acquired biological image by using a method on the basis of the portion captured.

For example, from the image of the finger tip, the biometric feature code generation unit 231 generates a biometric feature code that represents a feature of the finger print. For example, from the image of the palm, the biometric feature code generation unit 231 generates a biometric feature code that represents a feature of the veins. For example, from the image of the eye, the biometric feature code generation unit 231 generates a biometric feature code that represents a feature of the iris. In addition, for example, from the image of the signature, the biometric feature code generation unit 231 generates a biometric feature code that represents a feature of the handwriting. The biometric feature code is a binary bit string, for example.

When the user of the terminal device 200 gives a registration instruction, the secret information provision unit 232 provides secret information of the user. The secret information may previously be held in the RAM or the HDD of the terminal device 200 or inputted by the user via an input device. The secret information is information that is created by an individual user or given to an individual user. The secret information is not expected to be publicly available. It is preferable that the secret information be easily changeable information, unlike the biometric feature codes. Even if secret information or a template is leaked, the leaked template can be made invalid by changing the secret information. Thus, security can be restored. Examples of the secret information include an identification code such as a user ID, a password, a personal identification number, a secret key for encryption processing, a cash-card number, or a credit-card number.

When the user of the terminal device 200 gives a registration instruction, the registration request unit 233 acquires a biometric feature code from the biometric feature code generation unit 231 and secret information from the secret information provision unit 232. The registration request unit 233 generates a template by using the biometric feature code and the secret information and transmits a registration request including the template to the authentication device 100. The template does not include the biometric feature code itself or the secret information itself. Thus, when the registration processing is performed between the authentication device 100 and the terminal device 200, the biometric feature code and the secret information are protected.

When the authentication device 100 performs authentication on a plurality of users, an individual registration request may include identification information for identifying the corresponding user. The identification information may be information such as a user ID inputted by the user or may be information such as a cash-card number or a credit-card number read from a recording medium. A specific procedure of generating a template will be described below.

When the user of the terminal device 200 gives a matching instruction, the matching request unit 234 acquires a biometric feature code from the biometric feature code generation unit 231. The matching request unit 234 generates matching data by using the biometric feature code and transmits a matching request including the matching data to the authentication device 100. The matching data is different from the biometric feature code itself. Thus, when the matching processing is performed between the authentication device 100 and the terminal device 200, the biometric feature code is protected. When the authentication device 100 performs authentication on a plurality of users, an individual matching request may include identification information for identifying the corresponding user. A specific procedure of generating the matching data will be described below.

The authentication device 100 includes the database 120, a template registration unit 131, a secret information extraction unit 132, and a comparison unit 133. For example, the database 120 may be implemented by using a storage area ensured in the RAM 102 or the HDD 103. For example, the template registration unit 131, the secret information extraction unit 132, and the comparison unit 133 may be implemented by using program modules executed by the CPU 101.

The database 120 holds templates generated by the terminal devices 200 and 200a. As will be described below, each template corresponds to a user and includes two items of information. The first term in an individual template represents a masked value obtained by masking a biometric feature code obtained in the registration processing by using secret information. The second term in an individual template represents a hash value of the secret information. Each of the first and second terms in an individual template is a binary bit string, for example. When the authentication device 100 performs authentication on a plurality of users, identification information may be associated with an individual template.

The template registration unit 131 receives registration requests from the terminal devices 200 and 200a and registers templates included in the respective registration requests in the database 120. When identification information is included in a registration request, the template registration unit 131 may associate the template with the identification information and register the associated information in the database 120.

The secret information extraction unit 132 receives matching requests from the terminal devices 200 and 200a and acquires masked values in the first terms in the respective templates from the database 120. When identification information is included in a matching request, the secret information extraction unit 132 may acquire only the masked value corresponding to the identification information. By using the matching data included in the matching requests and the acquired masked values, the secret information extraction unit 132 attempts extraction of the secret information about the users.

When the received matching data has been generated on the basis of a biological image of the corresponding registered user, the corresponding secret information can accurately be extracted from the corresponding masked value. Otherwise, the corresponding secret information cannot be extracted from the corresponding masked value. The secret information extraction unit 132 outputs the extracted data to the comparison unit 133. A specific procedure of extracting secret information will be described below.

The comparison unit 133 calculates a hash value of the extracted data acquired from the secret information extraction unit 132. In addition, the comparison unit 133 acquires the hash value in the second term in the template from the database 120. When identification information is included in a matching request, the comparison unit 133 may acquire only the hash value corresponding to the identification information from the database 120.

The comparison unit 133 compares the hash value acquired from the database 120 with the hash value calculated from the extracted data and determines whether these values match. If these values match, the comparison unit 133 determines that the user using the terminal device that has transmitted the matching request is the corresponding registered user (success of authentication). If these values do not match, the comparison unit 133 determines that the user using the terminal device that has transmitted the matching request is not the corresponding registered user (failure of authentication). The comparison unit 133 transmits an authentication result indicating success or failure of authentication to the terminal device that has transmitted the matching request.

Inside the authentication device 100, the secret information extraction unit 132 attempts to restore the secret information. If the comparison unit 133 determines success of authentication, it means that the restored secret information is the accurate secret information that has been used to generate the template. Thus, if an administrator has operated the authentication device 100 with a malicious intent or if an attacker has succeeded in improperly operating the authentication device 100, the secret information could be improperly used. However, as will be described below, measures are taken in the second embodiment so that, even when secret information is improperly used, a corresponding biometric feature code cannot be extracted from the template. In addition, a biometric feature code cannot be extracted from the matching data included in a matching request.

FIG. 5 illustrates an example of a template table 121.

The template table 121 is held in the database 120. The template table 121 includes identification information, a masked value of a biometric feature code, and a hash value of secret information per authentication unit (per user, for example). The identification information is information such as a user ID or a card number for identifying an individual authentication unit.

Hereinafter, a template will be described. In the first term in the template, a masked value of a biometric feature code is indicated. The masked value is a value obtained by masking a biometric feature code generated in the registration processing by using a bit string generated from corresponding secret information. It is difficult to estimate the original biometric feature code from the masked value. A hash value of the secret information is indicated in the second term in the template. The hash value is obtained by converting the secret information by using a predetermined hash function. It is difficult to estimate the original secret information from the hash value.

Next, a biometric feature code protection method will be described. First, a simple fuzzy commitment implementation example will be described as one mode of biometric encryption. Next, an improved fuzzy commitment implementation example will be described.

In a simple fuzzy commitment implementation example, when the registration processing is performed, a template as indicated by mathematical expression (1) is generated. In mathematical expression (1), "x" represents a biometric feature code generated in the registration processing, "w" represents secret information, "Encode" represents an encoding function in a predetermined error correction encoding method, and "Hash" represents a predetermined hash function. "v" represents a value obtained by encoding the secret information w. The first term in the template represents a value obtained by masking the biometric feature code x by using v. The second term in the template represents a hash value of the secret information w. When individual data is treated as a binary number, operators "+" and "−" signify the exclusive OR of the individual bits. When individual data is treated as an integer, operators "+" and "−" signify addition and subtraction, respectively.

$$\{x-v, \text{Hash}(w)\} \text{ where } v=\text{Encode}(w) \quad (1)$$

In a simple fuzzy commitment implementation example, when the matching processing is performed, "v*" as indicated by mathematical expression (2) is calculated. In mathematical expression (2), "y" represents a biometric feature code generated in the matching processing. Namely, v* is the difference between the biometric feature code y and the first term in the template and is obtained by adding δ=y−x to v. When the biometric feature code x generated in the registration processing and the biometric feature code y generated in the matching processing are close enough, δ is close to zero and v* is close to v. However, in many cases, the biometric feature codes x and y do not perfectly match because of the difference between the imaging devices or imaging environments used or because of the difference of the posture of the user, for example.

$$v^*=y-(x-v)=v+\delta \text{ where } \delta=y-x \quad (2)$$

Next, "w*" as indicated by mathematical expression (3) is calculated from v*. In mathematical expression (3), "Decode" represents a decoding function in the predetermined error correction encoding method and corresponds to the encoding function Encode. When decoding v*=v+δ, if the biometric feature codes x and y are close enough to each other, δ is a minor noise that can be removed by an error correction function. Thus, w* obtained by decoding v* matches the original secret information w. However, if the biometric feature codes x and y are not close enough to each other, δ is a major noise that cannot be removed by the error correction function. Thus, w* obtained by decoding v* does not match the original secret information w.

$$\begin{aligned} w^* &= \text{Decode}(v^*) \\ &= \text{Decode}(v+\delta) \\ &= w \text{ if } x \simeq y \end{aligned} \quad (3)$$

Next, a hash value of w* is calculated and the hash value is compared with the second term in the template as illustrated in mathematical expression (4). When the biometric feature codes x and y are close enough to each other, since w* matches the secret information w, the two hash values match. However, when the biometric feature codes x and y are not close enough to each other, since w* does not match the secret information w, the two hash values do not match. When the two hash values match, success of authentication is determined. Otherwise, failure of authentication is determined. The probability (hash value collision probability) that the same hash value is calculated from different data is assumed to be sufficiently small.

$$\text{if } x \simeq y \text{Hash}(w^*) = \text{Hash}(w)$$

$$\text{else Hash}(w^*) \neq \text{Hash}(w) \quad (4)$$

In this simple fuzzy commitment implementation example, the biometric feature code x itself is not included in the template. However, w*=secret information w is calculated in the matching processing. If the secret information w is improperly used, v can be calculated by using the predetermined encoding function, and the biometric feature code x can be restored from the first term in the template and v. Thus, there is a risk of leakage of the biometric feature code x. In addition, the biometric feature code y itself is used for the calculation in the matching processing. Thus, there is also a risk of leakage of the biometric feature code y.

Thus, in the second embodiment, an improved fuzzy commitment implementation example is used as described below. In this improved implementation example, error correction encoding is performed twice so that the biometric feature codes x and y are not acquired. An encoding function "Encode$_1$" and a decoding function "Decode$_1$" based on a first error correction encoding method are prepared. In addition, an encoding function "Encode$_2$" and a decoding function "Decode$_2$" based on a second error correction encoding method are prepared.

As the first error correction encoding method, linear codes using (n, k$_1$, 2d$_1$+1) are used, in which "n" represents the bit length after encoding, "k$_1$" represents the bit length before encoding, and "d$_1$" represents the bit number that can be corrected when decoding is performed. As the second error correction encoding method, linear or non-linear codes using (k$_2$, p, 2d$_2$+1) are used, in which "k$_2$" represents the bit length after encoding, "p" represents the bit length before encoding, and "d$_2$" represents the bit number that can be corrected when decoding is performed. Since encoding is performed twice, k$_2$ is a value that is the same as or lower than that of k$_1$.

Examples of the linear codes include Hamming codes, Bose Chaudhuri Hocquenghem (BCH) codes, Reed-Solomon codes, turbo codes, Low Density Parity Check (LDPC) codes, and convolutional codes. Examples of the non-liner codes include, NR codes, Nadler codes, and Green codes. When linear codes are used in the second error correction encoding method, the same kind may be used for the first and second error correction encoding methods.

When Reed-Solomon codes are used for the two error correction encoding methods, for example, an implementation example in which n=2047, k$_1$=1023, k$_2$=511, p=351 is possible. When BCH codes are used for the two error correction encoding methods, for example, an implementation example in which n=8191, k$_1$=1535, k$_2$=1023, and p=223 is possible.

In this improved implementation example, in the registration processing, a template as indicated by mathematical expression (5) is generated. In mathematical expression (5), "s*" represents a random number generated in the registration processing and has the Hamming distance equal to or less than d$_2$. In addition, "r" is a value obtained by encoding the secret information w by using the encoding function Encode$_2$. The first term in the template is a result obtained by masking the biometric feature code x by using a bit string obtained by encoding r+s* by using the encoding function Encode$_1$. Namely, the biometric feature code x is masked by using a bit string obtained by encoding the secret information w twice. The second term in the template is a hash value of the secret information w, as is the case with the mathematical expression (1).

$$\{x+\text{Encode}_1(r+s^*), \text{Hash}(w)\} \text{ where } r=\text{Encode}_2(w) \quad (5)$$

In this improved implementation example, in the matching processing, matching data as indicated by mathematical expression (6) is calculated. In mathematical expression (6), "s" represents a random number generated in the matching processing and has the Hamming distance equal to or less than $d_2$. In the simple fuzzy commitment implementation example, the matching data is the biometric feature code y itself. However, in this improved implementation example, a bit string obtained by encoding the random number s by using the encoding function $Encode_1$ is used to mask the biometric feature code y. When individual data is treated as a binary value, "−y" is the same as the biometric feature code y. When individual data is treated as an integer, "−y" is a value obtained by inverting the plus or minus of the biometric feature code y.

$$\{-y + Encode_1(s)\} \quad (6)$$

Next, "T" as indicated by mathematical expression (7) is calculated. T is obtained by adding matching data to the first term in the template. Since the first error correction encoding method is linear encoding, if there is data α and β, $Encode_1$ (α)+$Encode_1$ (β) can be expressed as $Encode_1$ (α+β). Thus, T can be expressed as x−y+$Encode_1$ (r+s+s*). As is the case with the mathematical expression (2), when the biometric feature codes x and y are close enough to each other, T is close to $Encode_1$ (r+s+s*).

$$T = (x + Encode_1(r + s^*)) + (-y + Encode_1(s)) \quad (7)$$
$$= x - y + Encode_1(r + s + s^*)$$

Next, as indicated by mathematical expression (8) is calculated from T. This w* is obtained by decoding T in mathematical expression (7) with the decoding function $Decode_1$ and by decoding the decoded bit string with the decoding function $Decode_2$. When the decoding function $Decode_1$ is used, if the biometric feature codes x and y are close enough to each other, namely, if the Hamming distance of x−y is equal to or less than $d_1$, x−y is a minor noise that can be removed by the error correction function. Thus, a bit string obtained by decoding T corresponds to r+s+s*.

When the decoding function $Decode_2$ is used, because of the restrictions of the random numbers s and s*, the Hamming distance of s+s* is equal to or less than $d_2$. Namely, s+s* is a minor noise that can be removed by the error correction function. Thus, when T is properly decoded by the decoding function $Decode_1$, the decoding result of the decoding function $Decode_2$ matches the secret information w. However, when the biometric feature codes x and y are not close to each other, namely, when the Hamming distance of x−y is larger than $d_1$, x−y is a major noise that cannot be removed by the error correction function. Thus, the decoding result of decoding function $Decode_1$ is a bit string different from r+s+s*, and the decoding result of the decoding function $Decode_2$ does not match the secret information w.

$$w^* = Decode_2(Decode_1(T)) \quad (8)$$
$$= Decode_2(r + s + s^*)$$
$$= w \text{ if } x \simeq y$$

Next, a hash value of w* in mathematical expression (8) is calculated, and the calculated hashed value is compared with the second term in the template, as is the case with mathematical expression (4). When the biometric feature codes x and y are close enough to each other, since w* matches the secret information w, the two hash values match. However, when the biometric feature codes x and y are not close enough to each other, since w* does not match the secret information w, the two hash values do not match. When these two hash values match, success of authentication is determined. Otherwise, failure of authentication is determined.

In the improved implementation example, the authentication device 100 acquires the secret information w and r obtained by encoding the secret information w. However, since the authentication device 100 does not acquire the random number s*, it is difficult to restore the biometric feature code x from the first term in the template. Thus, even if the secret information w is improperly used in the authentication device 100, the biometric feature code x is protected. In addition, since the authentication device 100 does not acquire the random number s, it is difficult to restore the biometric feature code y from the matching data. Thus, the biometric feature code y is protected.

In the second embodiment, the authentication device 100 performs user authentication on the basis of the above improved implementation example. Next, a procedure of the processing performed by the authentication device 100 and the terminal devices 200 and 200a will be described.

Figure 6:
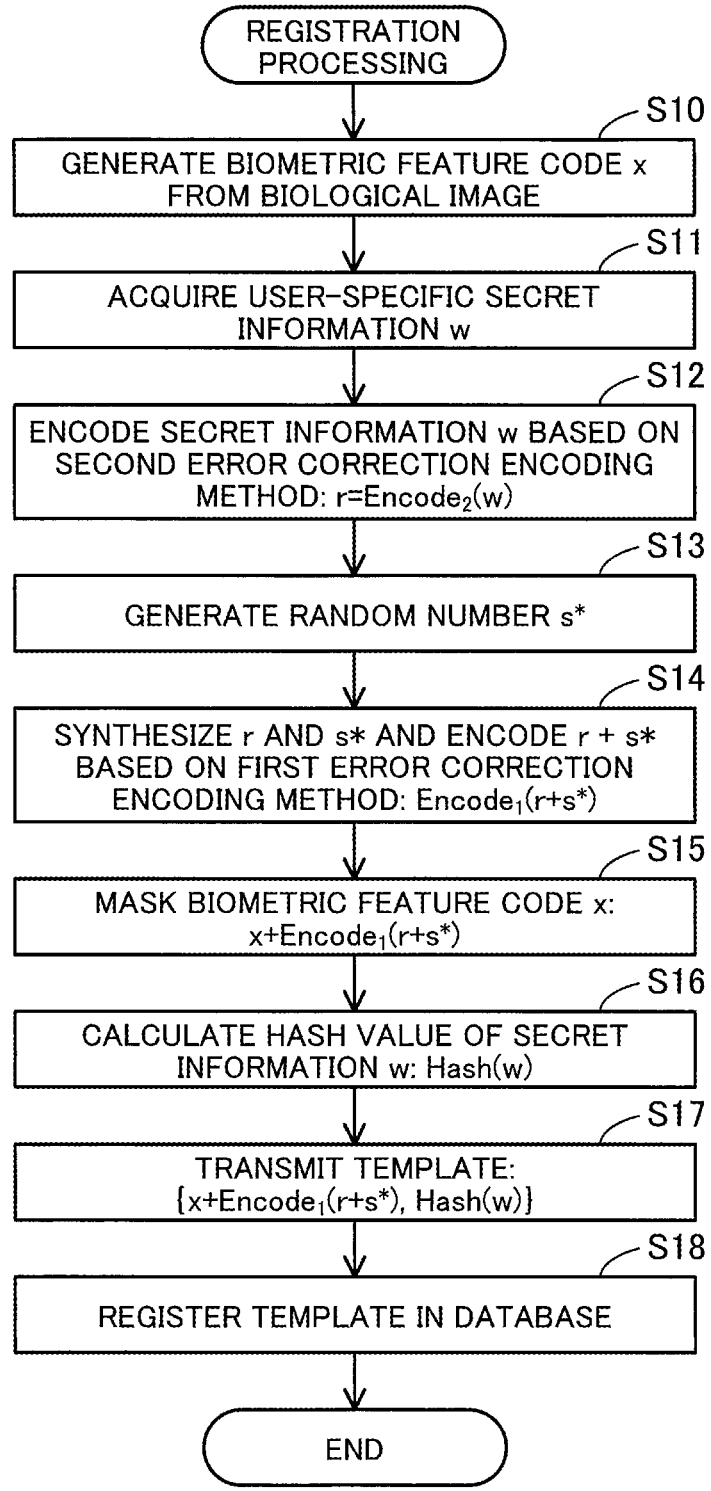
FIG. 6 is a flowchart illustrating an example of a procedure of registration processing.

FIG. 6 is a flowchart illustrating an example of a procedure of the registration processing.

The following description will be made assuming that a user issues a registration request by using the terminal device 200. The user is able to issue a registration request by using the terminal device 200a in the same way.

(S10) The biometric feature code generation unit 231 acquires a biological image from the imaging device 211. The biometric feature code generation unit 231 analyzes a physical feature such as a finger print, veins, or an iris or a behavioral feature such as handwriting on the biological image and generates a biometric feature code x.

(S11) The secret information provision unit 232 acquires user-specific secret information w. The secret information provision unit 232 may read the secret information w from a RAM or an HDD or may request the user to input the secret information w to an input device and acquire the secret information w from the input device.

(S12) The registration request unit 233 encodes the secret information w acquired in step S11 by using the encoding function $Encode_2$ based on the second error correction encoding method. Namely, the registration request unit 233 calculates r=$Encode_2$ (w).

(S13) The registration request unit 233 generates a random number s* whose Hamming distance is equal to or less than $d_2$ (the correctable bit number of the second error correction encoding method).

(S14) The registration request unit 233 calculates r+s* by synthesizing r calculated in step S12 and the random number s* generated in step S13. For example, r+s* is the exclusive OR of r and s*. The registration request unit 233 encodes r+s* by using the encoding function $Encode_1$ based on the first error correction encoding method. Namely, the registration request unit 233 calculates $Encode_1$(r+s*).

(S15) The registration request unit 233 masks the biometric feature code x generated in step S10 by using the $Encode_1$(r+s*) calculated in step S14. Namely, the registration request unit 233 calculates x+$Encode_1$(r+s*). For example, x+$Encode_1$(r+s*) is the exclusive OR of x and $Encode_1$(r+s*).

(S16) The registration request unit 233 calculates a hash value Hash(w) of the secret information w.

(S17) The registration request unit 233 generates a template in which the x+$Encode_1$(r+s*) calculated in step S15 is used as the first term and Hash(w) calculated in step S16 is used as the second term. The registration request unit 233 transmits a registration request including the template to the authentication device 100. Identification information may be included in the registration request.

(S18) The template registration unit 131 receives the registration request from the terminal device 200. The template registration unit 131 registers the template included in the received registration request in the database 120. In this step, the template registration unit 131 registers the first term of the template in the template table 121 as a masked value of the biometric feature code and registers the second term of the template in the template table 121 as a hash value of the secret information. If identification information is included in the registration request, the identification information may be registered in the template table 121.

Figure 7:
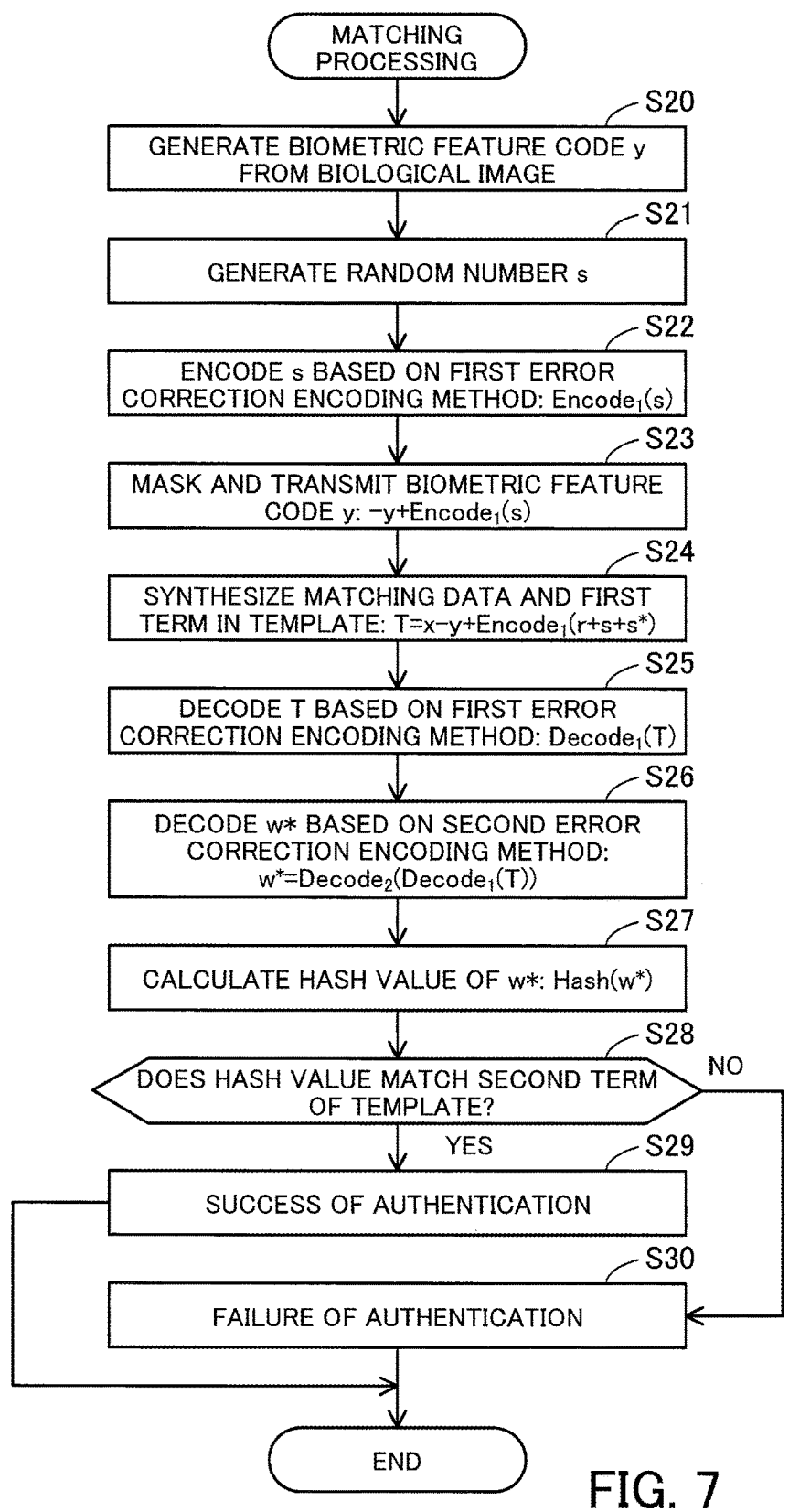
FIG. 7 is a flowchart illustrating an example of a procedure of matching processing.

FIG. 7 is a flowchart illustrating an example of a procedure of the matching processing.

The following description will be made assuming that a user issues a matching request by using the terminal device 200. The user is able to issue a matching request by using the terminal device 200a in the same way.

(S20) The biometric feature code generation unit 231 acquires a biological image from the imaging device 211. The biometric feature code generation unit 231 analyzes a physical feature such as a finger print, veins, or an iris or a behavioral feature such as handwriting on the biological image and generates a biometric feature code y.

(S21) The matching request unit 234 generates a random number s whose Hamming distance is equal to or less than $d_2$ (the correctable bit number of the second error correction encoding method).

(S22) The matching request unit 234 encodes the random number s generated in step S21 by using the encoding function $Encode_1$ based on the first error correction encoding method. Namely, the matching request unit 234 calculates $Encode_1$(s).

(S23) The matching request unit 234 masks the biometric feature code y generated in step S20 by using $Encode_1$(s) calculated in step S22. More specifically, the matching request unit 234 calculates −y+$Encode_1$(s). For example, −y+$Encode_1$(s) is the exclusive OR of y and $Encode_1$(s). The matching request unit 234 transmits a matching request including −y+$Encode_1$(s) as matching data to the authentication device 100. The matching request unit 234 may include identification information in the matching request.

(S24) The secret information extraction unit 132 receives the matching request from the terminal device 200. The secret information extraction unit 132 acquires the masked value x+$Encode_1$(r+s*) of the biometric feature code as the first term of the template from the template table 121. If identification information is included in the matching request, the secret information extraction unit 132 acquires the masked value associated with the identification information. The secret information extraction unit 132 calculates T by synthesizing the acquired masked value and the matching data included in the matching request. Namely, the secret information extraction unit 132 calculates T=x−y+$Encode_1$(r+s+s*). For example, T is the exclusive OR of x+$Encode_1$(r+s*) and −y+$Encode_1$(s).

(S25) The secret information extraction unit 132 decodes T calculated in step S24 by using the decoding function $Decode_1$ based on the first error correction encoding method. Namely, the secret information extraction unit 132 calculates $Decode_1$(T).

(S26) The secret information extraction unit 132 decodes $Decode_1$(T) calculated in step S25 by using the decoding function $Decode_2$ based on the second error correction encoding method. Namely, the secret information extraction unit 132 calculates w*=$Decode_2$($Decode_1$(T)).

(S27) The secret information extraction unit 132 calculates a hash value Hash(w*) of w* calculated in step S26. The same hash function as that used in step S16 is used.

(S28) The comparison unit 133 acquires the hash value Hash(w) of the secret information as the second term of the template from the template table 121. If identification information is included in the matching request, the comparison unit 133 acquires the hash value associated with the identification information. The comparison unit 133 compares the hash value Hash(w*) calculated in step S27 with the registered hash value Hash(w). If Hash(w*) and Hash(w) match, the operation proceeds to step S29. Otherwise, the operation proceeds to step S30.

(S29) The comparison unit 133 notifies the terminal device 200 of success of authentication.

(S30) The comparison unit 133 notifies the terminal device 200 of failure of authentication.

In the second embodiment, a user is authenticated depending on whether the secret information w is accurately restored, and the terminal device 200 or 200a is notified of an authentication result. However, the secret information w restored by the authentication device 100 may be used for different purposes.

For example, input information such as a personal identification number or a credit-card number that needs to be inputted to a different authentication system may be used as the secret information w. In this case, when the secret information w is successfully restored by biometric authentication, the authentication device 100 inputs the secret information w (the input information) to the different authentication system for the user. In this way, even when the user does not remember his or her own input information, the different authentication system is safely used. In addition, for example, a decryption key may be used as the secret information w. In this case, when the secret information w is successfully restored by biometric authentication, the authentication device 100 may restore different secret information protected by encryption, by using the secret information w (the decryption key).

In the information processing system according to the second embodiment, even when the biometric feature code x generated in the registration processing and the biometric feature code y generated in the matching processing do not perfectly match, if the biometric feature codes x and y are close enough to each other, success of authentication is determined. Thus, user authentication is appropriately performed. In addition, instead of the biometric feature code x itself, a masked value obtained by masking the biometric feature code x is registered in the database 120. Thus, a risk of leakage of the biometric feature code x is reduced. In addition, instead of the secret information w itself, a hash value of the secret information w is registered in the database 120. Thus, a risk of leakage of the secret information w is reduced.

In addition, when the registration processing is performed, the terminal devices 200 and 200a transmit masked values of the biometric feature codes x and hash values of the secret information w to the authentication device 100, respectively. Thus, a risk of leakage of the biometric feature codes x and the secret information w along the paths between the authentication device 100 and the terminal device 200 and 200a is reduced. In addition, when the matching processing is performed, the terminal devices 200 and 200a transmit masked values of the biometric feature codes y to the authentication device 100. Thus, a risk of leakage of the biometric feature codes y along the paths between the authentication device 100 and the terminal devices 200 and 200a is reduced.

In addition, a masked value of the biometric feature code x registered in the database 120 depends not only on the secret information w but also on the random number s* that the authentication device 100 does not acquire. Thus, even when a malicious administrator or attacker acquires the secret information w restored by the authentication device 100, it is difficult to estimate the biometric feature code x from the database 120. Namely, a risk of leakage of the biometric feature code x is reduced. In addition, the masked value of the biometric feature code y acquired in the matching processing depends on the random number s that the authentication device 100 does not acquire. Thus, it is difficult for a malicious administrator or attacker to estimate the biometric feature code y. Namely, a risk of leakage of the biometric feature code y is reduced.

In addition, since error correction encoding is performed twice, the random numbers s and s* are removed as minor noises during decoding. In addition, when the difference between the biometric feature codes x and y is sufficiently small, the difference can be removed as a minor noise. Thus, user authentication is appropriately performed.

In addition, as described above, the information processing according to the first embodiment may be realized by causing the encrypted-data processing device 10 to execute a program. The information processing according to the second embodiment may be realized by causing each of the authentication device 100 and the terminal devices 200 and 200a to execute a program.

An individual program may be recorded in a computer-readable recording medium (for example, the recording medium 113). Examples of the recording medium include a magnetic disk, an optical disc, a magneto-optical disk, and a semiconductor memory. Examples of the magnetic disk include an FD and an HDD. Examples of the optical disk include a CD, a CD-R (Recordable)/RW (Rewritable), a DVD, and a DVD-R/RW. The program may be recorded in a portable recording medium and then distributed. In this case, the program may be copied from the portable recording medium to a different recording medium (for example, the HDD 103), and the copied program may be executed.

According to one aspect, a risk of leakage of protection target data is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An encrypted-data processing method comprising:
generating a first code from secret information by using a second error correction encoding method and generating a second code from the first code and a first random number by using a first error correction encoding method;
generating first masked data by masking a first biometric feature code as registration target by using the second code and registering the first masked data in a database;
generating a third code from a second random number by using the first error correction encoding method;
generating second masked data by masking a second biometric feature code as matching target by using the third code; and
generating synthesized data by synthesizing the second masked data and the first masked data registered in the database and decoding the synthesized data in accordance with the first error correction encoding method and the second error correction encoding method.

2. The encrypted-data processing method according to claim 1, further comprising:
generating a first hash value from the secret information by using a hash function and registering the first hash value in the database;
generating a second hash value from a decoding result of the synthesized data by using the hash function; and
comparing the second hash value with the first hash value registered in the database.

3. The encrypted-data processing method according to claim 1,
wherein the first error correction encoding method is a linear encoding method, and the second error correction encoding method is a linear encoding method or a non-linear encoding method.

4. An encrypted-data processing apparatus comprising:
a storage device; and
a processor that
generates a first code from secret information by using a second error correction encoding method,
generates a second code from the first code and a first random number by using a first error correction encoding method,
generates first masked data by masking a first biometric feature code as registration target by using the second code,
registers the first masked data in the storage device,
generates a third code from a second random number by using the first error correction encoding method,
generates second masked data by masking a second biometric feature code as matching target by using the third code,
generates synthesized data by synthesizing the second masked data and the first masked data registered in the storage device, and
decodes the synthesized data in accordance with the first error correction encoding method and the second error correction encoding method.

5. A non-transitory computer-readable recording medium storing a computer program that causes a computer to perform a procedure comprising:
generating a first code from secret information by using a second error correction encoding method and generating a second code from the first code and a first random number by using a first error correction encoding method;
generating first masked data by masking a first biometric feature code as registration target by using the second code and registering the first masked data in a database;
generating a third code from a second random number by using the first error correction encoding method;
generating second masked data by masking a second biometric feature code as matching target by using the third code; and generating synthesized data by synthesizing the second masked data and the first masked data registered in the database and decoding the synthesized data in accordance with the first error correction encoding method and the second error correction encoding method.

* * * * *